E. A. BOLDT.
METHOD OF AND APPARATUS FOR PREPARING SOIL FOR CULTIVATION.
APPLICATION FILED JUNE 6, 1913.
1,241,816.
Patented Oct. 2, 1917.
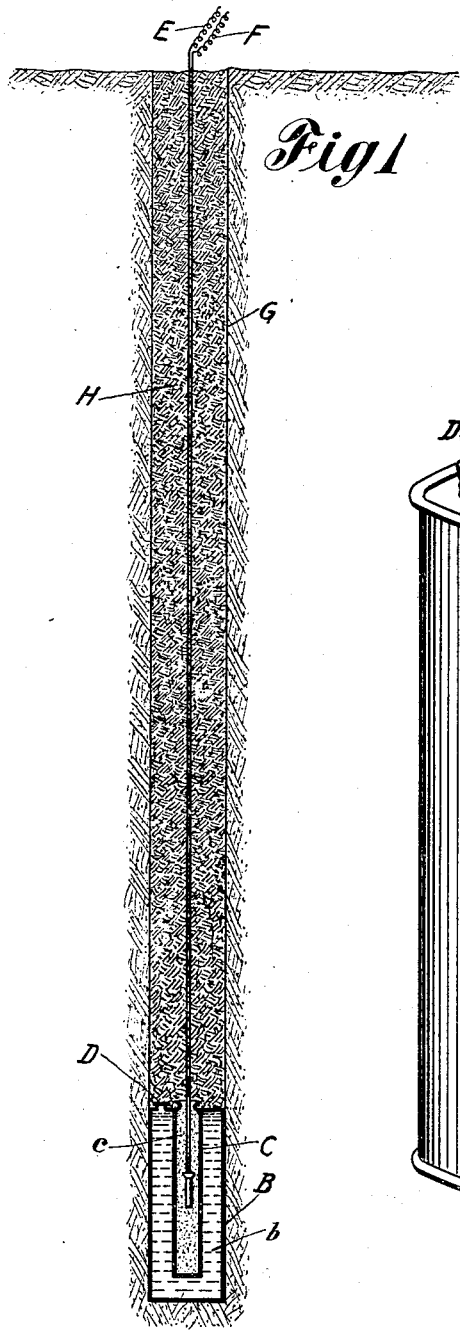
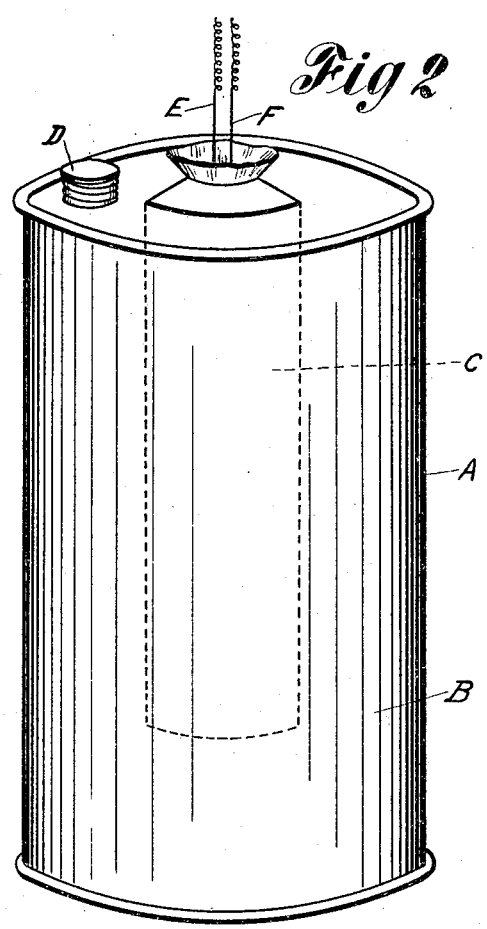
INVENTOR
E. A. BOLDT

UNITED STATES PATENT OFFICE.

ERICH AUGUST BOLDT, OF DRESDEN, GERMANY.

METHOD OF AND APPARATUS FOR PREPARING SOIL FOR CULTIVATION.

1,241,816.  Specification of Letters Patent.  Patented Oct. 2, 1917.

Application filed June 6, 1913. Serial No. 772,209.

*To all whom it may concern:*

Be it known that I, ERICH AUGUST BOLDT, a subject of the German Emperor, King of Prussia, residing at No. 4 Helmholzstrasse, Dresden, Germany, have invented a new and useful Method of and Apparatus for Preparing Soil for Cultivation; and I do hereby declare the following to be a full, clear, and exact description of the same.

Deep cultivation or loosening of the soil has proved of great value, in agriculture, in fruit culture, gardening and viniculture, also in formation of ponds and in forestry. Recently, explosives have been used for these purposes, especially for preparation of the soil.

The results heretofore so achieved may also be attained by the method hereinafter described, and in addition I may also fertilize the soil, especially its deeper layers, and bring about destruction of animals harmful to cultivation, as well as attaining other advantages herein pointed out.

The new method is distinguished from those heretofore proposed by employing the explosive charge not only to loosen the soil, but also to scatter throughout such loosened soil a material, preferably, a liquid intended to fertilize the soil, or destroy harmful animals or pests, or otherwise improve the soil. The kind or character of the liquid or other material will be determined by the results sought.

In practising the method, the charge and the mentioned material are buried together or adjacently into the soil to be loosened. Afterward the charge is, by electrical connections or otherwise, exploded; as a result the soil is loosened, and the loosened soil is saturated or impregnated with the liquid, or other material, scattered throughout or driven into the soil by the force of the explosion. The charge may be inserted at any desired depth into the soil, depending upon the character and hardness of the soil, the pests therein, the material to be grown, and the liquid, fertilizer, or other material to be mixed with the soil. To assure the proper relation of the charge and material, and the speedy insertion of the same, I propose to use a cartridge or other holder housing the charge and the material.

Figure 1, of the accompanying drawings, is a view through a mass of soil, showing (in section) the cartridge ready for explosion of the charge. Fig. 2 is a top perspective view of such a cartridge.

The illustrated cartridge consists of a body A, of any suitable liquid-proof and easily shattered material, having an inner compartment C, and an outer compartment B, surrounding and below that first-mentioned. Compartment C is intended to hold the explosive charge, while B is to hold the liquid, fertilizer or other material to be mixed with the loosened soil. A pouring opening D is provided for filling the compartment B.

In use, a suitable opening is made in the soil, G, and the cartridge is inserted therein. Earth or other material, H, is then tamped upon the cartridge, and at the desired moment, current is sent over the wires E and F, exploding the charge, c, shattering the container, loosening the soil in all directions, and the material, b, in compartment B is scattered throughout the loosened soil.

The material to be scattered may be a fertilizer of any kind; it preferably will be a liquid, such as liquid manure, bisulfid of carbon, or other material. Upon explosion of the charge, the material, b, will reach every part of the soil affected or loosened, and will saturate or impregnate the same. The liquid may be one which, when released from the compartment, becomes a gas or vapor.

If desired, the cartridge can be inserted in the openings leading to the retreat of rabbits or other animals, with the result that, upon explosion, these animals and other pests are killed, and the soil loosened and saturated with the enriching material.

A number of cartridges can be simultaneously or successively exploded, reducing the cost.

The new method has many advantages as compared with those heretofore followed for impregnation of soil with liquids, for instance. In some cases, for combating or destroying phylloxera, and in also for regeneration of vinicultural lands, bisulfid of carbon has been simply poured into holes, and the holes then closed. However, the gases of the bisulfid can penetrate but a small distance into the surrounding earth, which is often quite hard. To overcome this, many holes, separated by only very small distances, must be made and filled; even then the work is not complete or satisfactory, is tedious, and costly for labor and material. It is also dangerous, owing to the ready inflammability of the bisulfid in the presence of air.

In my method, these disadvantages are overcome, by providing the liquid in closed and easily-placed receptacles, the liquid is distributed (by the explosion) over the greatest possible area, and the soil is simultaneously loosened. My method is complete, thorough, quick, labor-saving, cheap and not dangerous. The liquid may be of gaseous nature or otherwise, and may be liquid manure, carried over a great area and to the deeper layers of the soil, which is especially advantageous for fruit orchards or plantations that have ceased to yield, and for increasing the yield of plants, shrubs, trees, etc.

I claim:

1. The herein described process of preparing soil for cultivation, said process consisting in placing an isolated charge containing fertilizing material below the surface of the soil, and causing an explosion within said charge to simultaneously loosen the soil and to commingle the fertilizing material therewith.

2. The herein described process of preparing soil for cultivation, said process consisting in placing a quantity of fertilizing material below the surface of the soil, and causing an explosion adjacent to said fertilizing material, to simultaneously loosen the soil and to commingle said fertilizing material therewith.

3. An apparatus for use in preparing soil for cultivation, said device comprising means for holding fertilizing material below the surface of the soil, and also comprising means for causing an explosion adjacent to and scattering the fertilizing material held as aforesaid.

4. An apparatus for use in preparing soil for cultivation, said device comprising means for holding fertilizing material, in the form of a hollow mass, below the surface of the soil, and also comprising means, located within the hollow mass aforesaid, for causing an explosion and to scatter said fertilizing material.

In testimony whereof, I have signed my name to this specification.

ERICH AUGUST BOLDT.

Copies of this patent may be obtained for five cents each, by addressing the "Commissioner of Patents, Washington, D. C."